(12) United States Patent
Bauer et al.

(10) Patent No.: US 7,845,566 B2
(45) Date of Patent: Dec. 7, 2010

(54) SECURITY LABEL AND METHOD FOR THE PRODUCTION THEREOF

(75) Inventors: Michael Bauer, Gernlinden (DE); Harald Reiner, München (DE)

(73) Assignee: Giesecke & Devrient GmbH, Munich (DE)

( * ) Notice: Subject to any disclaimer, the term of this patent is extended or adjusted under 35 U.S.C. 154(b) by 854 days.

(21) Appl. No.: 10/550,493

(22) PCT Filed: Apr. 6, 2004

(86) PCT No.: PCT/EP2004/003674

§ 371 (c)(1),
(2), (4) Date: Sep. 26, 2005

(87) PCT Pub. No.: WO2004/090841

PCT Pub. Date: Oct. 21, 2004

(65) Prior Publication Data
US 2006/0192377 A1 Aug. 31, 2006

(30) Foreign Application Priority Data
Apr. 10, 2003 (DE) ................. 103 16 771

(51) Int. Cl.
*G06K 19/06* (2006.01)
(52) U.S. Cl. ................... 235/492; 235/487; 235/488; 283/57; 283/72; 283/81; 283/91
(58) Field of Classification Search .......... 235/492, 235/487, 488
See application file for complete search history.

(56) References Cited

U.S. PATENT DOCUMENTS

| 5,492,370 | A | * | 2/1996 | Chatwin et al. | ............. 283/110 |
|---|---|---|---|---|---|
| 5,528,222 | A | * | 6/1996 | Moskowitz et al. | ...... 340/572.7 |
| 5,763,058 | A | * | 6/1998 | Isen et al. | ................. 428/209 |
| 5,886,798 | A | * | 3/1999 | Staub et al. | ................... 359/2 |
| 6,206,292 | B1 | * | 3/2001 | Robertz et al. | ............. 235/488 |
| 6,830,192 | B1 | * | 12/2004 | Krul et al. | .................. 235/492 |
| 7,168,623 | B1 | * | 1/2007 | Royer | ........................ 235/492 |
| 2003/0164611 | A1 | * | 9/2003 | Schneider et al. | ............. 283/57 |
| 2004/0157054 | A1 | * | 8/2004 | Rancien | ..................... 428/343 |

FOREIGN PATENT DOCUMENTS

| CA | 2414746 | * | 1/2003 |
|---|---|---|---|
| DE | 2748498 | | 5/1978 |
| EP | 1134694 A1 | | 9/2001 |
| EP | 1148440 A1 | | 10/2001 |
| EP | 1179811 A1 | | 2/2002 |
| EP | 1073993 A1 | | 12/2004 |
| GB | 1127043 A | | 9/1968 |
| GB | 2128581 A | | 5/1984 |
| WO | WO93/22146 | * | 11/1993 |
| WO | 0202350 A1 | | 1/2002 |

* cited by examiner

*Primary Examiner*—Daniel A Hess
*Assistant Examiner*—Michael Andler
(74) *Attorney, Agent, or Firm*—Bacon & Thomas, PLLC

(57) ABSTRACT

A self-adhesive security label for a data carrier, such as a security document or document of value, with a substrate (40), to the front of which security features (12-18, 42) are applied and the back of which is provided with a cold adhesive foil (34). The security label contains an integrated circuit (30) disposed in a recess (36) of the adhesive foil (34) for storing security data and an antenna (32) disposed intermediate between substrate (40) and adhesive foil (34) and connected with the integrated circuit (30) for a contactless communication with the integrated circuit (30).

16 Claims, 2 Drawing Sheets

SECURITY LABEL AND METHOD FOR THE PRODUCTION THEREOF

BACKGROUND OF THE INVENTION

A. Field

The invention relates to a self-adhesive security label for a data carrier, such as a security document or document of value, with a substrate, to the front of which security features are applied and the back of which is provided with a cold adhesive layer. The invention furthermore relates to a data carrier with such a security label and a method for producing such a security label.

B. Related Art

Data carriers within the terms of the present invention in particular are security documents or documents of value, such as bank notes, passports, identification documents, visa stickers, check forms, share certificates, deeds and the like.

Such documents often are put through elaborate processes, so as to render the documents to be distinguishable from imitations or forgeries. For this purpose they are provided with security elements, which are difficult to imitate and permit the authenticity check of the security element being made by a layman. For example, printed areas produced by intaglio printing are characterized by a tactility that is easy to recognize even for the layman, and which cannot be reproduced by other printing methods, in particular by copying machines or scanners.

The security elements often are formed as self-adhesive security labels, which are pasted to the security document or document of value by an authorized authority, for example a passport authority. The security label likewise can have the form of stickers or seals, which serve, for instance, for securing high-quality products or their packaging.

From the print DE 27 48 498 A1 a multilayer label for marking objects is known, which, in the event that a removal of the label is attempted, will be destroyed or defaced to such an extent that its transference to another object is noticeable. The label has a flexible transparent plastic layer, which on one side contains a print that contains an information. On its printed side the layer is provided with a pressure sensitive adhesive layer as to be capable to being applied to an object. The print adheres more strongly to the adhesive layer than to the layer, so that if removal of the label is attempted, at least a part of the adhesive layer adhering to the surface underneath is left thereon, and at least a part of the print adheres to this adhesive layer.

The print GB 2 128 581 A discloses a transparent film with translucent markings printed on one side. On the same side of the film a pressure sensitive adhesive is applied, so as to be able to paste the film over an information to be protected in a passport, for example a photograph. The employed adhesive is selected such that the attempt to remove the film will result in an irreparable damage of the surface underneath or of the film itself.

On these premises the invention is based on the problem to create a security label that is improved compared to the prior art. In particular, the security label is to be designed such that it allows a usage in especially security-relevant products, for example as a biometrics label or visa sticker.

According to the invention, a security label of the above-mentioned kind contains an integrated circuit disposed in a recess of the adhesive layer for storing security data and an antenna disposed intermediate between substrate and adhesive layer and connected with the integrated circuit for a contactless communication with the integrated circuit. The functionality of the self-adhesive security label by this means is extended by an electronic memory function, for example for storing biometric data.

BRIEF SUMMARY OF THE INVENTION

The design according to the invention allows the intensive processing of the security label during the manufacturing process, without loading the required integrated circuit too strongly, since this integrated circuit cannot be connected to the antenna via the recess of the adhesive layer until the end of the manufacturing process.

At the same time the security label of the invention has the advantage, that with an attempt to remove the security label from a surface it is bonded to, there is a strong possibility that either the antenna itself is destroyed or the circuit connected with the antenna is separated from the antenna, so that the communication unit no longer is able to function. In contrast to this, conventional labels equipped with a transponder, which permit a contactless communication with a chip, have a structure sturdy to such a degree that a nondestructive removal of the transponder from the label is possible.

In the simplest case the recess is formed circular, but can also be oval, rectangular, star-shaped or can have any desired form, which provides sufficient space for a later incorporation of the integrated circuit.

The recess with the integrated circuit preferably is closed by a covering element, in particular a self-adhesive covering element. It is understood, that the form of the covering element expediently is adjusted to the form of the recess, so as to achieve a complete covering by the cold adhesive layer and covering element being disposed in an overlapping fashion.

According to an expedient development of the invention the antenna is printed on or embossed into the substrate.

The front-side security features advantageously have a passport photograph, a finely structured pattern, in particular a guilloche print, machine readable features, such as a machine readable note, fluorescent substances, magnetic or electrically conductive substances, or a polydimensional bar code. Such security features basically are known and therefore are not explained in detail in the following.

In an especially preferred embodiment the front-side security features of the security label contain a printed area produced by intaglio printing. In this printed area the substrate surface is partially deformed by the impress in the printing plate and provided with a relatively thick ink layer. Such a printed area due to its tactility is easily recognizable even for the layman and thus can be used as an authenticity feature. While with the conventional designs of security labels the high pressures, which occur with intaglio printing, inevitably damage a bonded chip, in the security label according to the invention the integrated circuit is not incorporated and connected to the antenna until after the intaglio printing step.

By means of the intaglio printing preferably a printed relief is produced in the substrate, which has a relief height of 25 micron to 80 micron. Attention has to be paid to the fact, that the relief height achieved in the printing result depends on both the engraving depth of the printing plate, and on the properties of the substrate material and the printing ink. Furthermore, the relief height is perceived in different manners depending on the individual sensitivity of a user. But in general a printed relief with a relief amplitude of 50 micron or more results in tactilely clearly perceptible relief structures.

According to an advantageous development, the front-side security features at least partially are covered with a covering layer, so as to counter mechanical and/or chemical loads or signs of wear on the security features. In particular when the front-side security features contain a printed area produced by intaglio printing, it may be expedient to cover only a part of the intaglio printing area with the covering layer, and to provide the other part for the purpose of a simple and direct tactile authenticity testing by the user.

The above-mentioned covering layer advantageously has a thickness of less than 20 micron, in particular about 6 micron to about 12 micron. Furthermore, for further enhancing the security of the label the covering layer can contain holographic diffraction structures. As covering layer materials for example polyethylene terephthalate or various thermoplastics can be used. In order to not conceal the information being present therebelow, the covering layer preferably is transparent or at least translucent. In some applications it may be advantageous, when the covering layer is colored.

The substrate of the security label preferably is made of cotton paper or paper with a mixture of cotton/synthetic fiber. Alternatively, the substrate can be formed of a polymer substrate.

The invention also contains a data carrier, in particular a document of value, such as a bank note, a passport, an identification document, a visa sticker or the like, having a security label as described above. The security label according to the invention can also be applied to a high-quality product or a product packaging.

The adherence strengths of the cold adhesive covering layer and of the bond between the integrated circuit and the antenna here preferably are adjusted to each other such that a removal of the security label from the data carrier results in damaging the antenna or separating antenna and integrated circuit.

A method for producing a self-adhesive security label for a data carrier comprises the procedure steps:

a) providing a substrate, b) applying security features to a front of the substrate, c) applying an antenna arrangement to a back of the substrate, d) applying a cold adhesive layer, which has a recess in the area of the antenna arrangement, to the back of the substrate which is provided with the antenna arrangement, and e) incorporating an integrated circuit into the recess and connecting the integrated circuit with the antenna arrangement.

The antenna arrangement here advantageously is applied to the back of the substrate by ink jet printing or screen printing conductive inks or by hot stamping a conductive layer. The antenna arrangement likewise can be completely applied to the substrate as a metallized foil, which is coated with an adhesive activable by heat, by means of transfer method.

For protecting the integrated circuit the recess of the adhesive layer after the incorporation of the integrated circuit advantageously is closed with a self-adhesive covering element.

According to an expedient variant of the method, with the reel-fed application of security features the substrate is provided with a background print by offset printing method. Applying the antenna arrangement and the cold adhesive layer to the back of the substrate likewise preferably is effected in a reel-fed fashion.

In an especially preferred development of the invention, with the application of the security features a printed area is produced by intaglio printing. This step advantageously is carried out in sheet format after the antenna arrangement and the cold adhesive layer have been applied and before the integrated circuit is incorporated. In this way a pressure load onto the integrated circuit during the intaglio printing is avoided.

DESCRIPTION OF THE DRAWINGS

Further embodiments as well as advantages of the invention are explained in the following with reference to the Figures. For clarity's sake the figures do without a true-to-scale and true-to-proportion representation.

DETAILED DESCRIPTION OF THE PREFERRED EMBODIMENTS OF THE INVENTION

Figure 1:
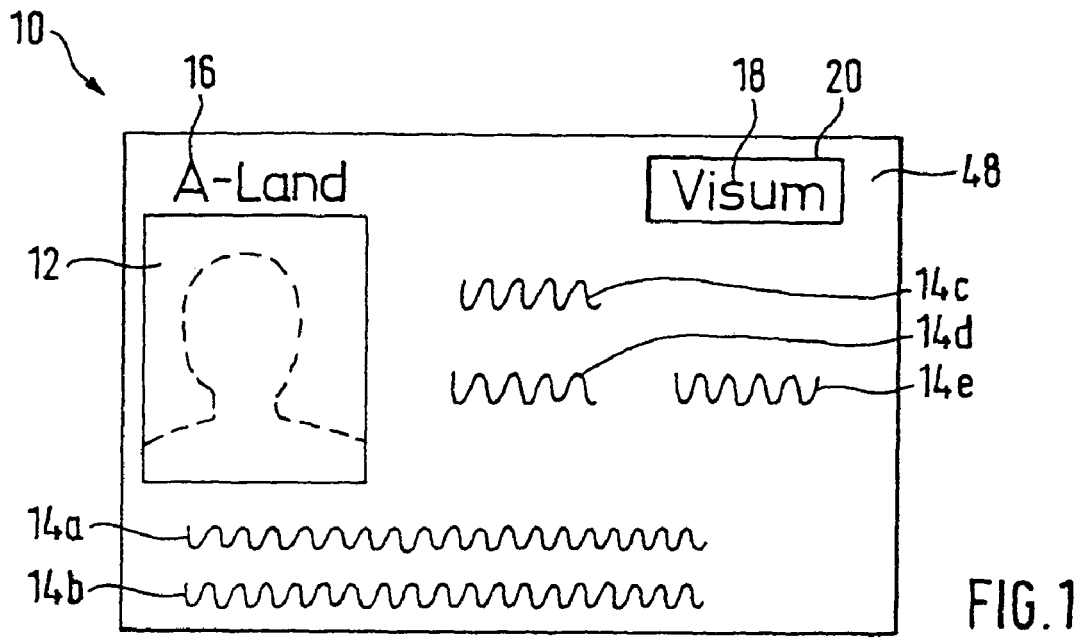
FIG. 1 shows a top view of a visa sticker according to one embodiment of the invention in schematic representation.
Figure 2:
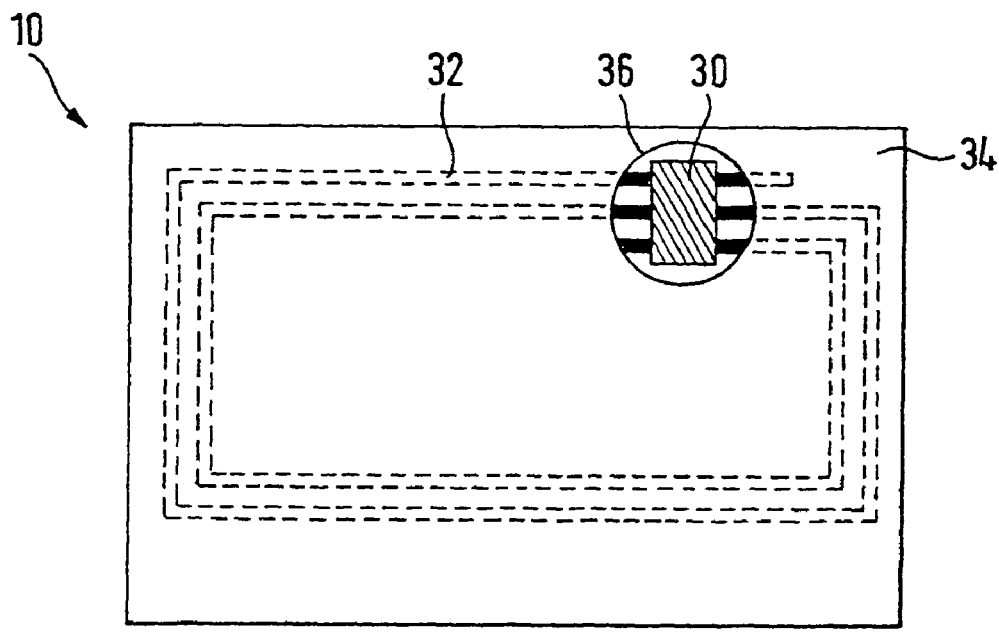
FIG. 2 shows the back of the visa sticker of FIG. 1 with an already bonded integrated circuit, but still unclosed recess in the adhesive layer.
Figure 3:
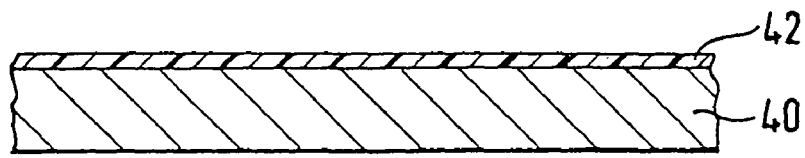
FIG. 3 to 6 show four intermediate steps of a method according to the invention for producing a visa sticker, each with reference to a cross-sectional view through a visa sticker such as shown in FIG. 2.

FIGS. 1 and 2 show a schematic representation of a visa sticker 10 according to one embodiment of the invention. The front of the visa sticker 10 contains a passport photograph 12 of the owner and further personalized information in machine readable form 14a to 14e, which, inter alia, comprises the name 14a of the owner, an identification number 14b, the place of issue 14c and the period of validity of the visa 14d, 14e.

In order to produce tactile printed patterns, in certain areas 16,18 of the visa sticker 10 over the background print 42 a print is effected with steel engraving. In the embodiment the country of issue 16 and the writing "VISA" 18 is effected by intaglio printing. In other variations for example the passport photograph 12 can be provided with a pattern in intaglio printing.

For protecting the personal data the front of the visa sticker 10 additionally is laminated with a covering layer 48 of a thickness of about 10 micron, which has an opening 20 above the area of the writing 18. Because of that the writing "VISA" is easy to feel with the fingertips. Additionally, diffraction structures not shown in the Figure are embossed into the covering layer 48 as further security features.

As shown in FIG. 2 the back of the visa sticker 10 carries a transponder with an integrated circuit 30, which stores for example biometric data of the owner. For a contactless communication with the circuit 30 to the back of the substrate is applied an antenna 32 made of a conductive foil material.

Furthermore, the back of the substrate and the antenna 32 are covered with a cold adhesive layer 34, with the help of which the visa sticker 10 can be pasted in a passport. In a contact area of the antenna 32, in which the antenna 32 and the circuit 30 are connected to each other, the cold adhesive layer 34 has a recess 36, in which at the end of the manufacturing process the circuit 30 is incorporated and contacted to the antenna 32.

After having contacted the integrated circuit 30 the recess 36 is closed with a covering element 38 made of a cold adhesive layer. Thus the integrated circuit 30 is incorporated after the intaglio printing step, during which the visa sticker 10 is subject to especially high pressures.

The production of the visa sticker 10 of FIGS. 1 and 2 in the following is explained in more detail with reference to the intermediate steps of the process as shown in FIG. 3 to 6. The Figures each show a cross section through a described visa sticker 10.

At first a substrate 40, in the embodiment it is a paper substrate, is provided. The reel-fed paper substrate 40 is provided with a background print 42, which may contain various security features, for example a passport photograph 12, a guilloche print, machine readable notes 14a-14e or the like. This situation is shown in the FIG. 3.

Then onto the back of the paper substrate 40 is bonded in a reel-fed fashion an antenna 32 made of a suitable conductive foil material. In a variation of the method the application of the antenna 32 is effected by a screen printing or ink jet printing with conductive inks.

Figure 4:
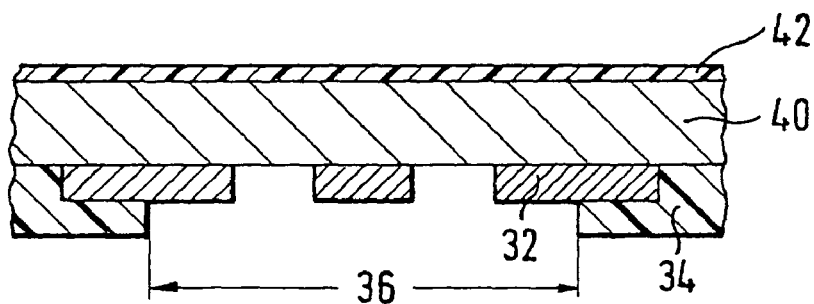

Then a reel-fed adhesive foil 34 with a not shown covering paper is applied. At the position, at which subsequently is contacted the integrated circuit 30, the adhesive layer 34 has a recess 36 of appropriate size, as shown in FIG. 4.

Figure 5:
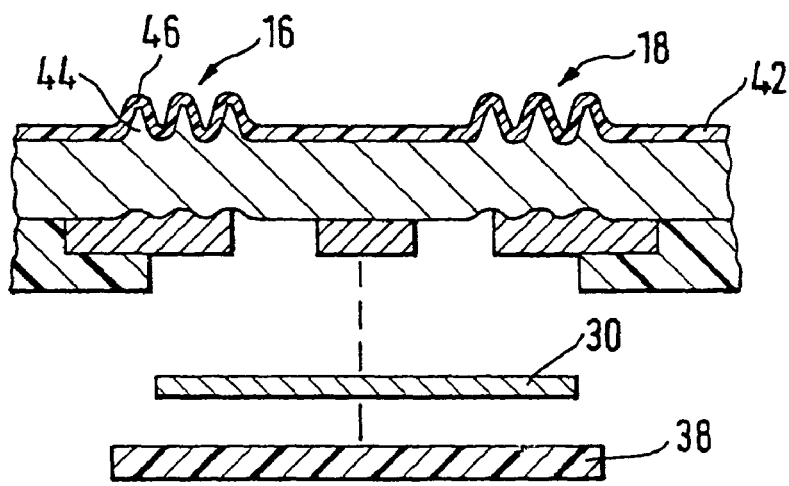

Now the visa stickers 10 prepared on a reel are cut into sheets and the further processing is effected in sheet format. Then onto the respective areas 16 and 18 of the background print 42 the steel engraving is printed. In these areas the visa sticker then has tactile relief structures with a strong embossing 44 and comparatively thick inking 46, as shown in FIG. 5. After the intaglio printing the integrated circuit 30 is incorporated into the recess 36 and bonded to the antenna 32 at the contact points. Subsequently a functional testing of the transponder formed by the antenna 32 and the integrated circuit 30 is effected.

Then the recess 36 is closed with a suitably formed, in the embodiment round, covering element 38 made of a cold adhesive layer.

Figure 6:
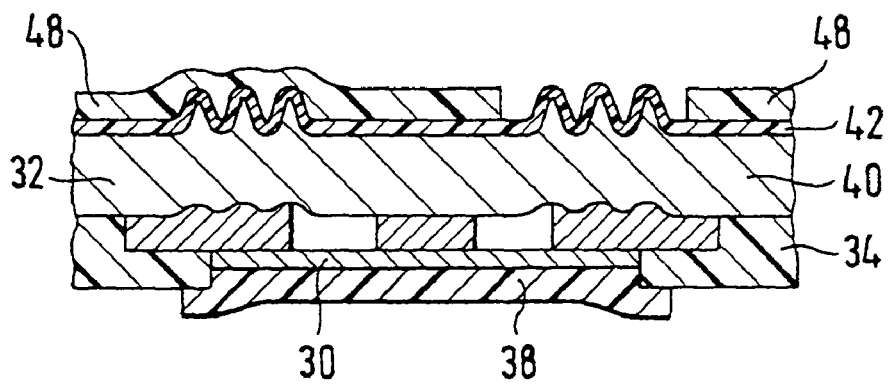

In a further step the front of the visa sticker 10 is laminated with a covering layer 48 containing diffraction structures. Since the covering layer 48 reduces the tactile detectability of the steel engraving areas, in the area 18 it has an opening 20, through which the printed relief of the steel engraving is tactile in an unchanged manner. Such a finished visa sticker 10 is shown in FIG. 6 in cross section.

The invention claimed is:

1. Self-adhesive security label for a data carrier exemplified by a security document or a document of value, comprising a substrate on the front side of which are applied security features and on the back side of which is provided a cold adhesive layer, wherein the security label includes an integrated circuit disposed in a recess of the adhesive layer adapted to store security data, the recess with the integrated circuit being closed by a self-adhesive covering element, and an antenna disposed between the substrate and the adhesive layer, said antenna connected with the integrated circuit so as to provide a contactless communication with the integrated circuit wherein the front-side security features contain a printed area produced by an intaglio printing method and, wherein the adhesive strengths of the self adhesive covering element and of the bond between the integrated circuit and the antenna are adjusted relative to each other such that a removal of the security label from the data carrier results in damaging the antenna or separating the antenna from the integrated circuit.

2. Security label according to claim 1, wherein the antenna is printed on, bonded to or embossed into the substrate.

3. Security label according to claim 1, wherein the front-side security features are selected from the group consisting of a passport photograph, a finely structured pattern, machine readable features, fluorescent substances, magnetic or electrically conductive substances, and a polydimensional bar code.

4. Security label according to claim 1, wherein the front-side security features at least partially are covered with a covering layer, wherein the covering layer has a thickness of less than 20 micron.

5. Security label according to claim 4, wherein the covering layer contains holographic diffraction structures.

6. Security label according to claim 1, wherein the substrate comprises cotton paper or paper with a mixture of cotton/synthetic fiber.

7. Data carrier carrying a security label according to claim 1.

8. Method for producing a self-adhesive security label for a data carrier including the steps:
   a) providing a substrate;
   b) applying security features to a front of the substrate, wherein a printed area is provided on the substrate by an intaglio printing method;
   c) applying an antenna arrangement to a back of the substrate;
   d) applying a cold adhesive layer with a recess in the area of the antenna arrangement to the back of the substrate which is provided with the antenna arrangement,
   e) incorporating an integrated circuit into the recess and connecting the integrated circuit with the antenna arrangement, after applying the security features to the substrate, and
   f) closing the recess with the integrated circuit by a self-adhesive covering element wherein the adhesive strengths of the self adhesive covering element and of the bond between the integrated circuit and the antenna are adjusted relative to each other such that a removal of the security label from the data carrier results in damaging the antenna or separating the antenna from the integrated circuit.

9. Method according to claim 8, including applying the antenna arrangement by screen printing conductive inks.

10. Method according to claim 8, further comprising the step of hot stamping or bonding a conductive foil to the back of the substrate.

11. Method according to claim 8, wherein step b) is carried out by providing a reel-fed substrate with a background print by offset printing method.

12. Method according to claim 8, wherein the steps c) and d) are effected in a reel-fed manner.

13. Method according to claim 8, including carrying out in step b), by providing a printed area on the substrate by an intaglio printing method.

14. Method according to claim 13, wherein the intaglio printing is carried out in sheet format after the steps c) and d) and before step e).

15. Self-adhesive security label for a data carrier exemplified by a security document or a document of value, comprising a substrate on the front side of which are applied security features and on the back side of which is provided a cold adhesive layer, wherein the security label includes an integrated circuit disposed in a recess of the adhesive layer adapted to store security data and an antenna disposed between the substrate and the adhesive layer, said antenna connected with the integrated circuit so as to provide a contactless communication with the integrated circuit wherein the front-side security features contain a printed area produced by an intaglio printing method and wherein the adhesive strengths of the cold adhesive layer and of the bond between the integrated circuit and the antenna are adjusted relative to each other such that a removal of the security label from the data carrier results in damaging the antenna or separating the antenna from the integrated circuit.

16. Method for producing a self-adhesive security label for a data carrier including the steps:
 a) providing a substrate;
 b) applying security features to a front of the substrate, wherein a printed area is provided on the substrate by an intaglio printing method;
 c) applying an antenna arrangement to a back of the substrate;
 d) applying a cold adhesive layer with a recess in the area of the antenna arrangement to the back of the substrate which is provided with the antenna arrangement,
 e) incorporating an integrated circuit into the recess and connecting the integrated circuit with the antenna arrangement, after applying the security features to the substrate, wherein the adhesive strengths of the cold adhesive layer and of the bond between the integrated circuit and the antenna are adjusted relative to each other such that a removal of the security label from the data carrier results in damaging the antenna or separating the antenna from the integrated circuit.

* * * * *